(12) United States Patent
Landrum et al.

(10) Patent No.: US 8,096,739 B1
(45) Date of Patent: Jan. 17, 2012

(54) METHOD AND APPARATUS FOR TRANSPORTING WIND TURBINE BLADES (75) Inventors: Scott Landrum, Southlake, TX (US); Eric Thompson, North Richland, TX (US)

(73) Assignee: BNSF Railway Company, Fort Worth, TX (US)

( * ) Notice: Subject to any disclaimer, the term of this patent is extended or adjusted under 35 U.S.C. 154(b) by 330 days.

(21) Appl. No.: 12/420,356

(22) Filed: Apr. 8, 2009

(51) Int. Cl.
*B60P 3/40* (2006.01)
(52) U.S. Cl. .......................................... 410/45
(58) Field of Classification Search .............. 410/44, 410/45; 220/1.5; 105/396, 404, 407, 411, 105/355, 393
See application file for complete search history.

(56) References Cited

U.S. PATENT DOCUMENTS

| | | | |
|---|---|---|---|
| 4,671,714 A | 6/1987 | Bennett | |
| 4,929,132 A | 5/1990 | Yeates et al. | |
| 5,139,374 A * | 8/1992 | Holt et al. | 410/64 |
| 6,546,878 B1 | 4/2003 | Smith et al. | |
| 6,626,619 B1 | 9/2003 | Exnowski et al. | |
| 6,983,844 B2 | 1/2006 | O'Kane et al. | |
| 7,210,882 B2 | 5/2007 | Anderson et al. | |
| 7,303,365 B2 | 12/2007 | Wobben | |
| 7,591,621 B1 * | 9/2009 | Landrum et al. | 410/45 |
| 7,670,090 B1 * | 3/2010 | Landrum et al. | 410/44 |
| 7,744,318 B2 * | 6/2010 | Wobben | 410/45 |
| 2003/0175089 A1 | 9/2003 | Almind | |
| 2005/0123382 A1 | 6/2005 | Christensen et al. | |
| 2005/0180833 A1 | 8/2005 | Almind | |
| 2006/0113449 A1 | 6/2006 | Nies | |
| 2006/0251517 A1 | 11/2006 | Grabau | |
| 2006/0285937 A1 | 12/2006 | Wobben | |
| 2007/0145181 A1 | 6/2007 | Pedersen | |
| 2007/0177954 A1 | 8/2007 | Kootstra et al. | |
| 2007/0189895 A1 | 8/2007 | Kootstra et al. | |
| 2007/0248431 A1 | 10/2007 | Jensen | |
| 2007/0253829 A1 | 11/2007 | Wessel et al. | |

* cited by examiner

*Primary Examiner* — H Gutman
(74) *Attorney, Agent, or Firm* — James E. Walton; Richard G. Eldredge (57) ABSTRACT

A rail system for transporting wind turbine blades includes both pivoting and pivoting-sliding support structures carried by a plurality of railcars. Each support structure includes a platform system having a bolster for supporting the wind turbine blade and a support plate for supporting the bolster. The pivoting and pivoting-sliding support structures allow for selective rotational and longitudinal movement of the blades relative to the railcars as the rail system negotiates straight and curved sections of railway.

11 Claims, 9 Drawing Sheets

METHOD AND APPARATUS FOR TRANSPORTING WIND TURBINE BLADES

BACKGROUND

1. Field of the Invention

The present invention relates generally to transportation methods and systems, and more specifically to methods and systems for transporting wind turbine blades by rail.

2. Description of Related Art

Figure 1:
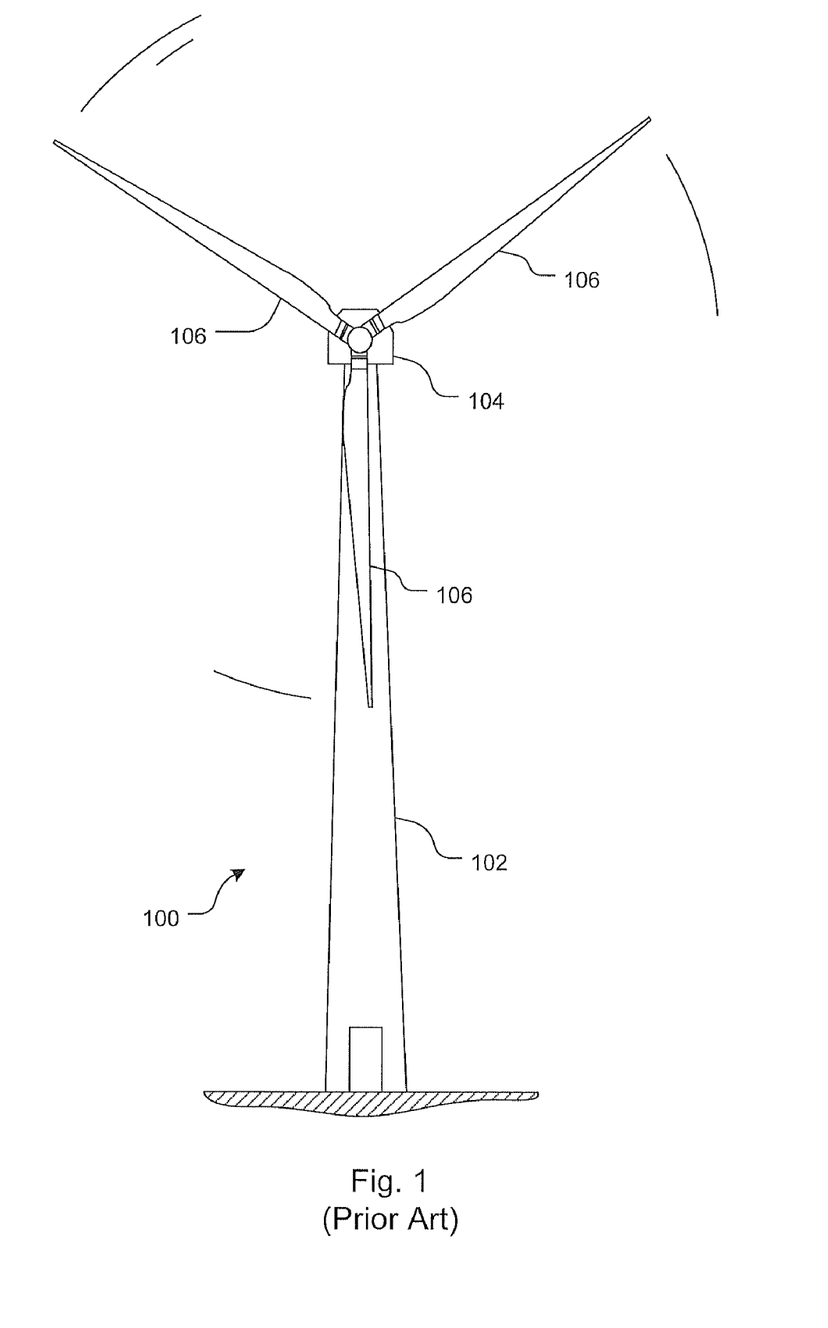
FIG. 1 is a front view of a conventional wind turbine.

Large wind turbines, such as wind turbine 100 depicted in FIG. 1, must be disassembled into component parts for transportation on railcars, ships, trucks, and other vehicles. Wind turbine 100 includes a tower 102, a nacelle 104, and a plurality of rotor blades 106. Unlike tower 102, blades 106 are not disassembled into smaller components for transportation. Typically, blades 106 are relatively large, sometimes exceeding 160 feet in length and 12 feet in width.

Figure 2A:
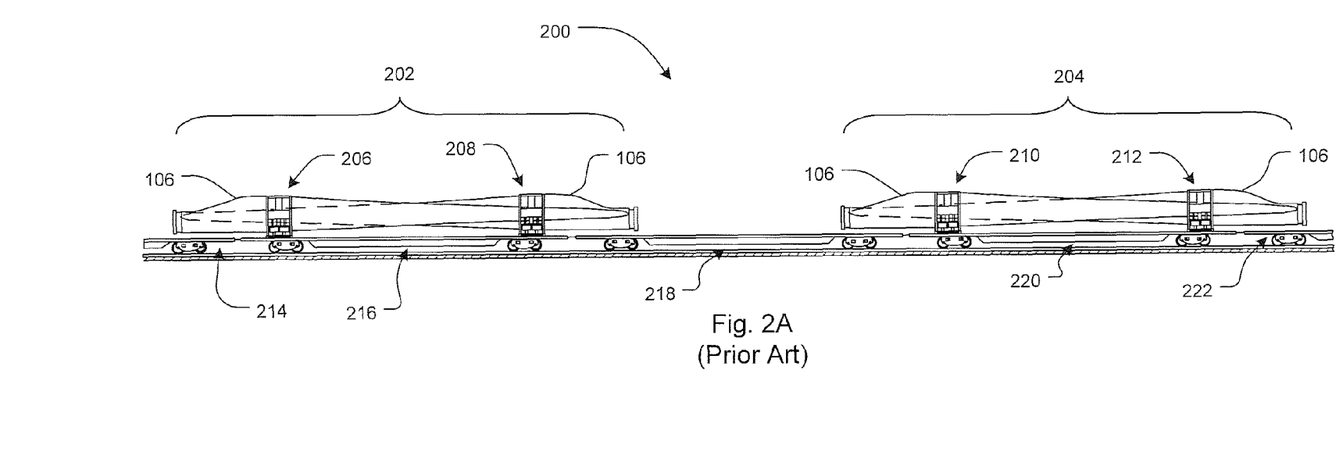
FIG. 2A is a side view of a conventional rail system for transporting wind turbine blades.
Figure 2B:
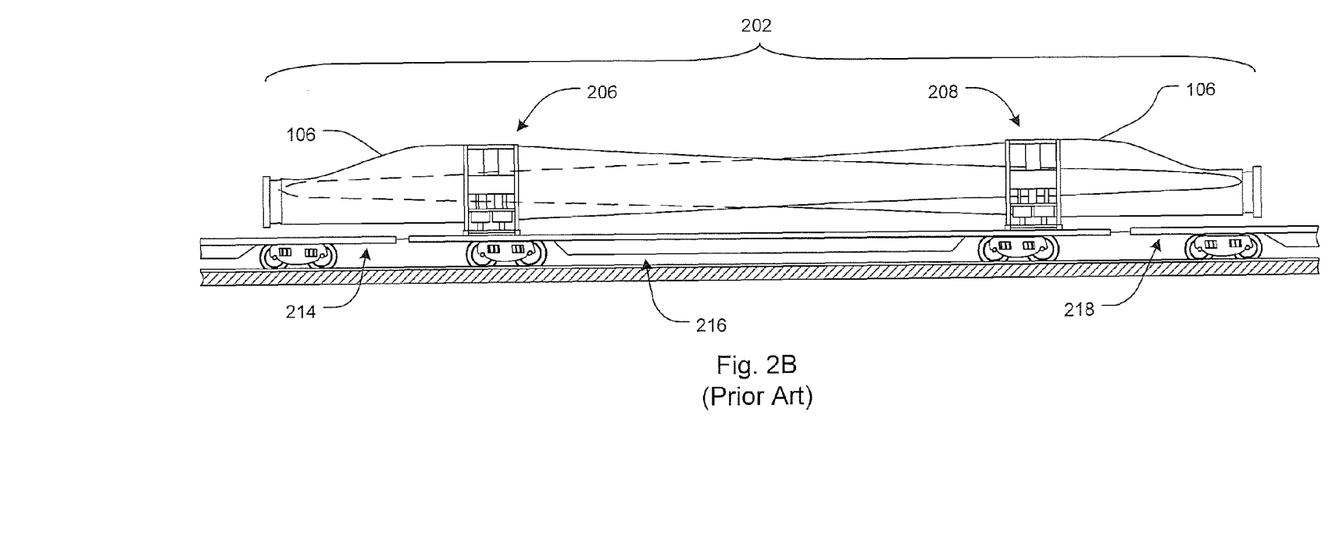
FIG. 2B is an enlarged side view of a section of the rail system of FIG. 2A.

A known method for transporting blades 106 by rail is shown in FIGS. 2A and 2B. FIG. 2A is a side view of a rail system 200 for carrying four blades 106. FIG. 2B is an enlarged side view of one of the sections of rail system 200. Rail system 200 consists of two sections: a first section 202 composed of railcars 214, 216, and 218; and a second section 204, composed of railcars 218, 220, and 222. Two support structures 206 and 208 are rigidly coupled to railcar 216. Likewise, two support structures 210 and 212 are rigidly coupled to railcar 220. Support structures 206 and 208 do not move relative to railcar 216, and support structures 210 and 212 do not move relative to railcar 216. Because of the extreme length of blades 106 and the design of rail system 200, five railcars (railcars 214, 216, 218, 220, and 222) must be used, three of which (railcars 214, 218 and 222), do not even carry any of the loads from blades 106. As a result, rail system 200 has many disadvantages, including: (1) the rail system requires relatively long railcars; (2) some of the railcars used do not even carry any loads; and (3) wasted space is created between loaded railcars.

Thus, although significant strides have been made in the area of transporting wind turbine blades, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

In the interest of clarity, not all features of an actual implementation are described in this specification. It will of course be appreciated that in the development of any such actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 3A:
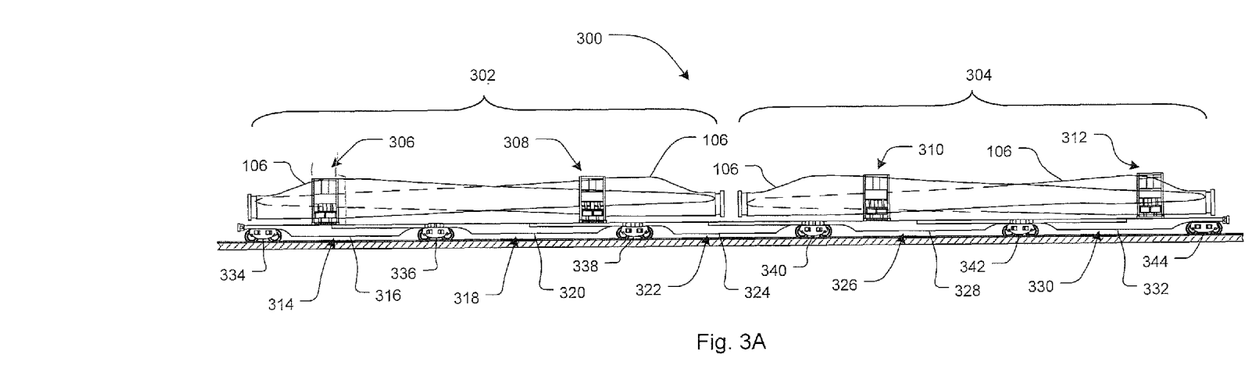
FIG. 3A is a side view of a rail system for transporting wind turbine blades according to the preferred embodiment of the present application.
Figure 3B:
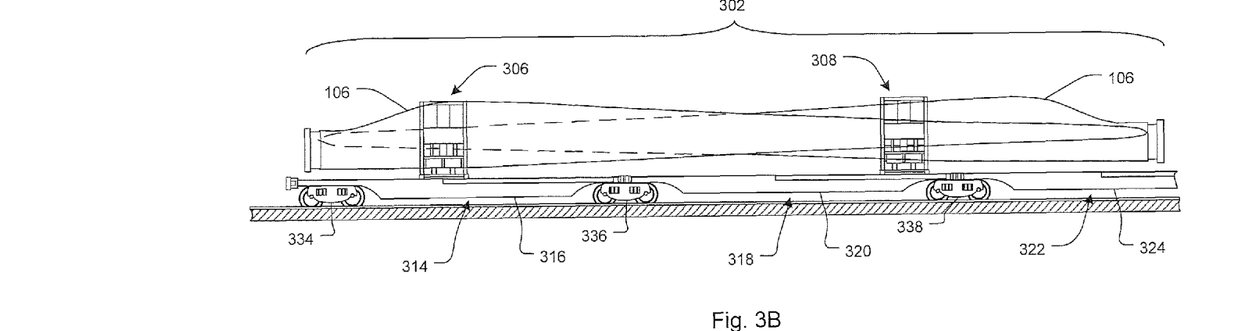
FIG. 3B is an enlarged side view of a section of the rail system of FIG. 3A.

Referring now to FIGS. 3A and 3B in the drawings, side views of the preferred embodiment of a rail system 300 according to the present application are illustrated. FIG. 3A is a side view of rail system 300, and FIG. 3B is an enlarged side view of one of the sections of rail system 300. Rail system 300 consists of two sections: a first section 302 composed of railcars 314, 318, and 322; and a second section 304, composed of railcars 322, 326, and 330. In the preferred embodiment, railcars 314, 318, 322, 326, and 330 are spine-type railcars having center sills 316, 320, 324, 328, and 332, respectively. Section 302 includes a first pivoting support structure 306 and a first pivoting-sliding support structure 308. Similarly, section 304 includes a second pivoting support structure 312 and a second pivoting-sliding support structure 310. Railcars 314, 318, 322, 326, 330 are supported with respective trucks 334, 336, 338, 340, 342, and 344. As shown, middle trucks 336, 338, 340, and 342 are shared between adjoining railcars.

Each blade 106 is approximately 125 feet in length. As such, in order to transport two sets of blades 106 arranged in two pairs placed end to end, rail system 300 must be at least 250 feet long. In the preferred embodiment, each railcar 314, 318, 322, 326, and 330 is approximately 52 feet in length, providing an approximate total length of 260 feet. This allows for clearance between the two sets of blades 106 and any railcars that may be adjacent to either end of rail system 300. It will be appreciated that alternative embodiments of rail system 300 may include more or less railcars, depending upon the length of the blades being transported. In addition, alternative embodiments may also include smaller-sized railcars that reduce the space between sections 302 and 304. For example, an idler railcar, which could be shorter in length than railcars 314, 318, 322, 326, and 330 could be used to compensate for the overhanging blade portions between sections 302 and 304.

Figure 4:
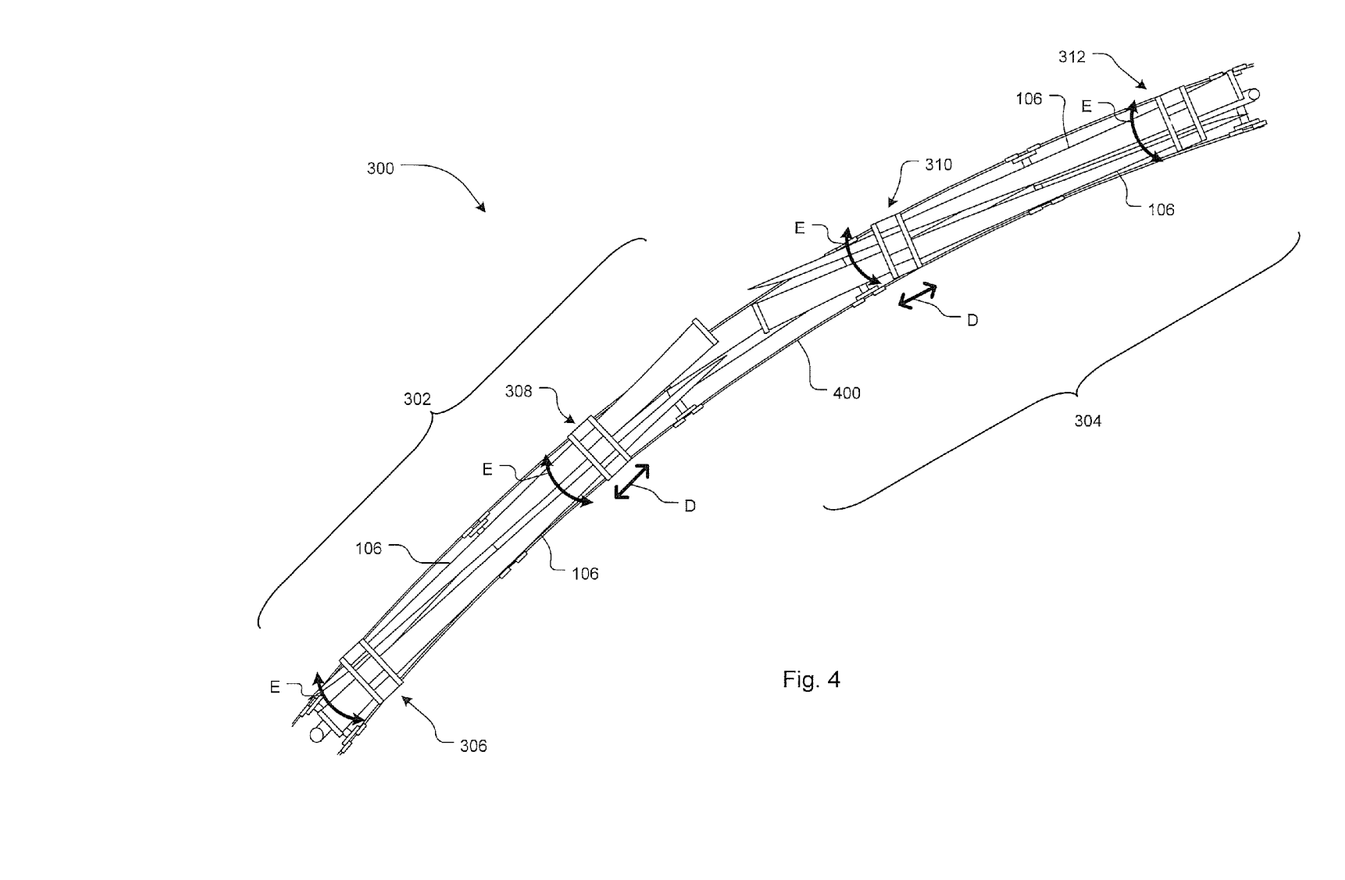
FIG. 4 is a top view of the rail system of FIG. 3A shown negotiating a curve.

Referring now also to FIG. 4 in the drawings, rail system 300 is shown in a top view negotiating a section of curved railway 400. As explained in more detail below, support structures 306 and 312 are configured for pivotal movement in the direction of arrows A relative to railcars 314 and 330, respectively. In addition, support structures 308 and 310 are configured for pivotal movement in the direction of arrows E and longitudinal sliding movement in the direction of arrows D relative to railcars 318 and 326, respectively. These pivoting and pivoting-sliding movements allow the first set of blades 106 to be secured to support structures 306 and 308, and the second set of blades 106 to be secured to support structures 310 and 312, while allowing railcars 314, 318, 322, 326, and 330 to travel along both straight and sections of railway without damaging blades 106. This is necessary because the distance between support structures 306 and 308 decreases as railcars 314, 318, and 322 negotiate curved section of railway 400; and because the distance between support structures 310 and 312 decreases as railcars 322, 326, and 330 negotiate curved section of railway 400.

Figure 5:
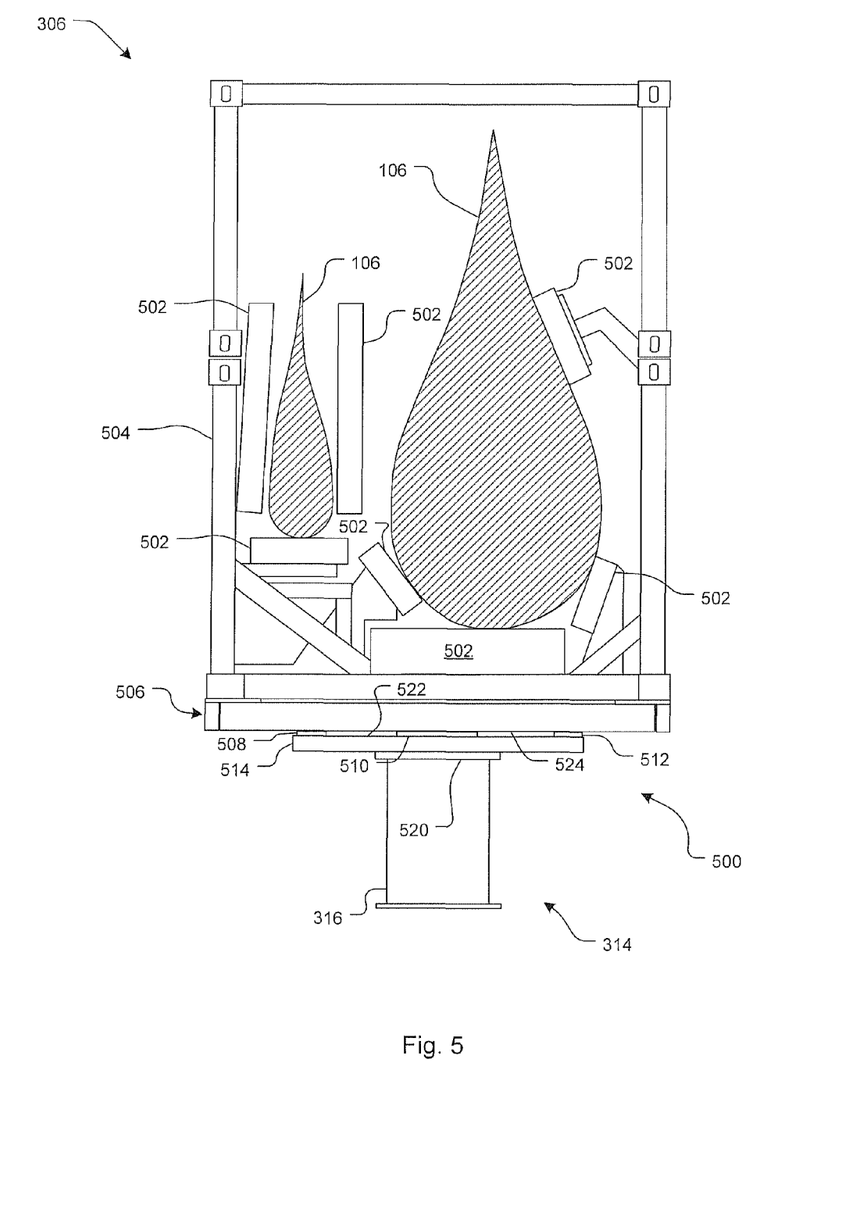
FIG. 5 is a front view of a support structure of the rail system of FIG. 3A.

Referring now also to FIG. 5 in the drawings, a front view of pivoting support structure 306 is shown. Support structure 306 includes a frame assembly 504 coupled to a platform system 500. Frame assembly 504 includes a cushion system 502 for supporting and securing blades 106. Platform system 500 includes a bolster 506 pivotally coupled to a support plate 514. In the preferred embodiment, frame 504 is coupled to bolster 506 with four twist-lock devices 602 (see FIG. 6). Support plate 514 is rigidly coupled to center sill 316 of railcar 314 and preferably includes one or more wear pads 508, 510, and 512. As shown, bolster 506 is supported by wear pads 508, 510, and 512. In the preferred embodiment, wear pads 508, 510, and 512 are composed of a metallic material and rigidly attached to a top surface 522 of support plate 514; however, wear pads 508, 510, and 512 may be composed of a composite material, a hybrid composite-metallic material, or any other suitable material that compensates for friction wear. As support structure 306 rotates, a bottom surface 524 of bolster 506 rubs against wear pads 508, 510, and 512. An optional lubricant may be applied between the wear pads and bottom surface 524 for decreasing friction wear. In the preferred embodiment, wear pads 508, 510, and 512 are rigidly attached to top surface 522; however, it will be appreciated that in alternative embodiments, replaceable wear pads may be utilized.

Figure 6:
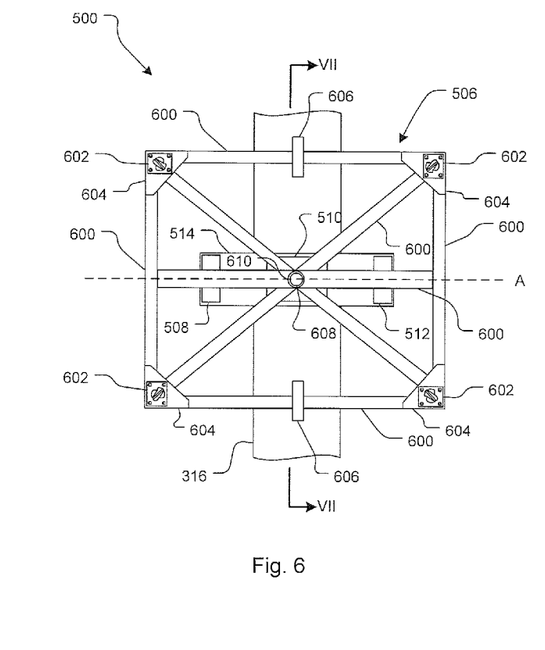
FIG. 6 is a top view of a pivoting platform system for use with the support structure of FIG. 5.
Figure 7:
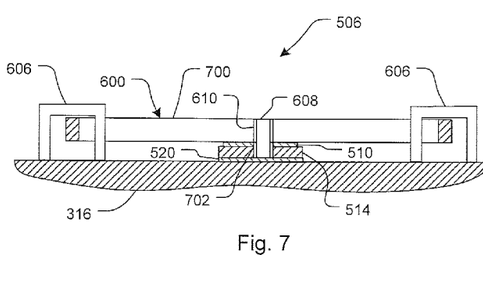
FIG. 7 is a cross-sectional view of the pivoting platform system of FIG. 6 taken at VII-VII in FIG. 6.
Figure 8:
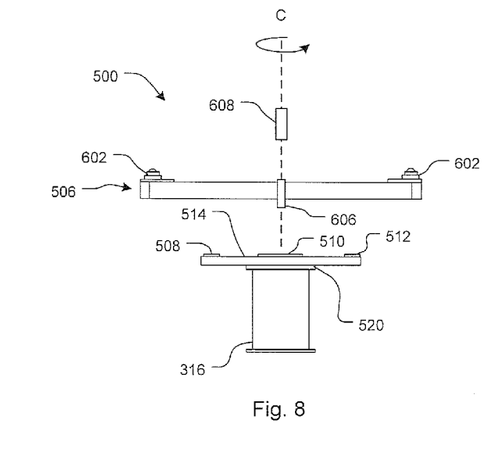
FIG. 8 is an exploded front view of the pivoting platform system of FIG. 6.
Figure 9:
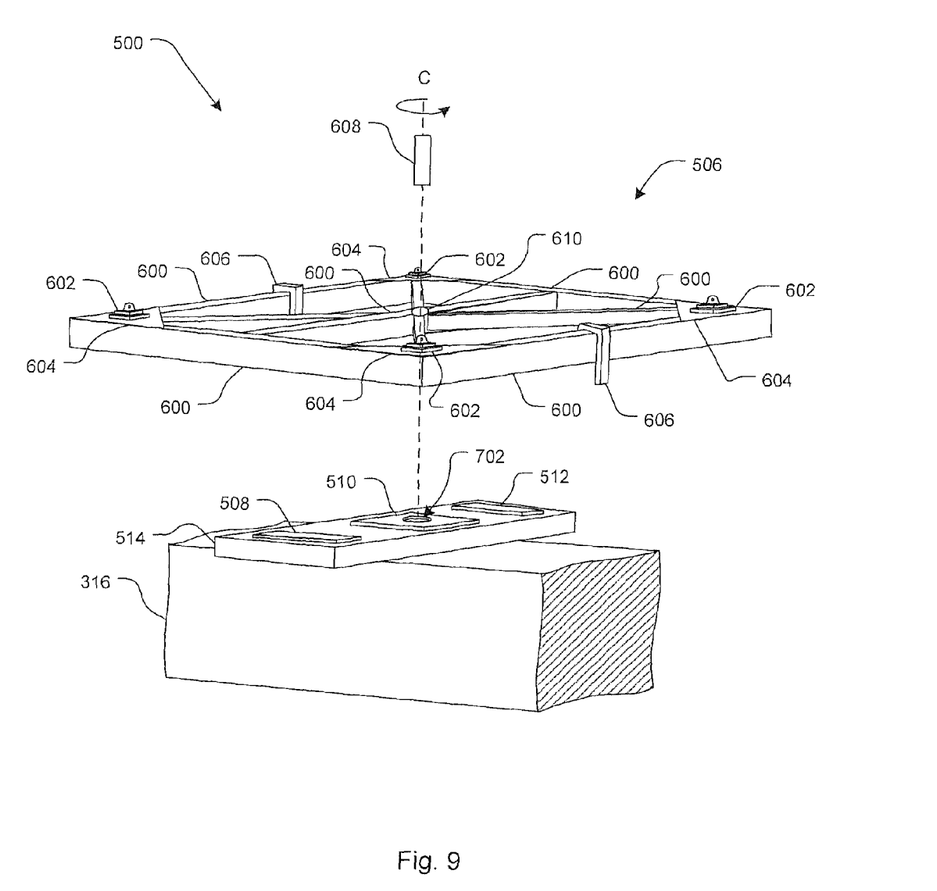
FIG. 9 is an exploded oblique view of the pivoting platform system of FIG. 6.
Figure 10A:
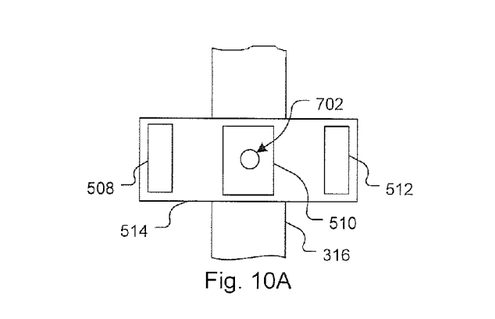
FIG. 10A is a top view of a pivoting support plate for use with the pivoting platform system of FIG. 6.
Figure 10B:
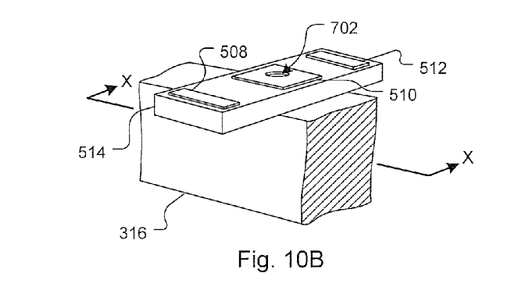
FIG. 10B is an oblique view of the pivoting support plate of FIG. 10A.
Figure 10C:
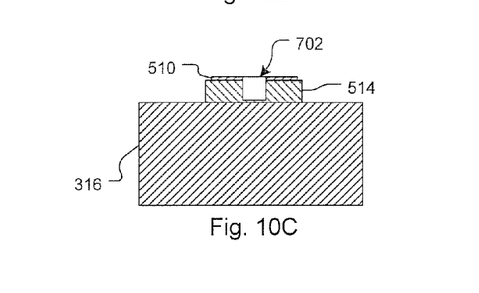
FIG. 10C is a longitudinal cross-sectional view of the pivoting support plate of FIG. 10B taken at X-X in FIG. 10B.

Referring now also to FIGS. 6-9 and 10A-10C in the drawings, platform system 500 is illustrated in various views. In FIG. 6 is a top view of platform system 500. FIG. 7 is a longitudinal cross-sectional view of platform system 500 taken at VII-VII in FIG. 6 is illustrated. FIG. 8 is an exploded front view of the pivoting platform system of FIG. 6. FIG. 9 is an exploded oblique view of the pivoting platform system of FIG. 6. FIG. 10A is a top view of a pivoting support plate for use with the pivoting platform system of FIG. 6, FIG. 10B is an oblique view of the pivoting support plate of FIG. 10A, and FIG. 10C is a longitudinal cross-sectional view of the pivoting support plate of FIG. 10B taken at X-X in FIG. 10B.

Bolster 506 may be used with both pivoting support structures, such as support structures 306 and 312, and pivoting-sliding support structures, such as support structures 308 and 310. As such, only bolster 506 will be described in detail. In the preferred embodiment, bolster 506 includes a plurality of support members 600 for supporting frame 504. Frame 504 is releasably coupled to bolster 506 by a plurality, preferably four, quick-release, bayonet-type, twist-lock devices 602. It will be appreciated that other types of releasable attachment devices may be used. Corner plates 604 may be used at the adjoining corners of support members 600 for added strength and rigidity, and to support twist-lock devices 602. One or more anti-rotation straps 606 are preferably coupled to sill 316 to prevent bolster 506 from rotating about a generally transverse axis A.

Bolster 506 includes a pivot pin 608 positioned within a housing 610 and extending into a circular bore 702. This configuration allows bolster 506 to rotate relative to support plate 514 about a generally vertical axis C, but prevents bolster 506 from translating longitudinally relative to support plate 514.

As is shown, anti-rotation straps 606 bear against top surfaces 700 of support members 600, thereby preventing substantial pitching of bolster 506 about axis A, but allowing rotational movement of bolster 506 about axis C. Anti-rotation straps 606 preferably have a U-shaped configuration and are composed of a metallic material suitable for friction wear between anti-rotation straps 606 and top surface 700. In alternative embodiments, anti-rotation straps 606 may include a composite, a hybrid composite-metal, or other suitable material that compensates for friction wear. In addition, an optional lubrication could be applied to top surface 700 for decreasing friction wear. Platform system 500 may include an optional spacer plates 520 positioned at various locations, such as between support plate 514 and center sill 316, to accommodate any differences in height between various support structures.

Figure 11A:
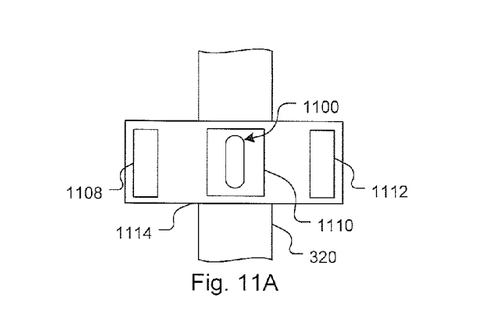
FIG. 11A is a top view of a pivoting-sliding support plate for use with the support structure of FIG. 5.
Figure 11B:
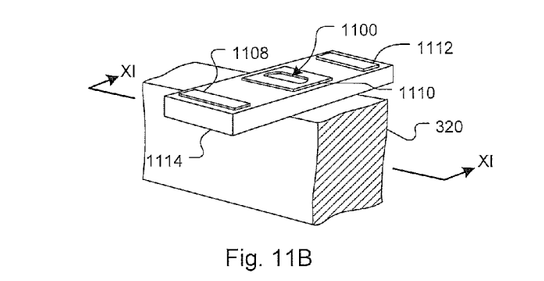
FIG. 11B is an oblique view of the pivoting-sliding support plate of FIG. 11A.
Figure 11C:
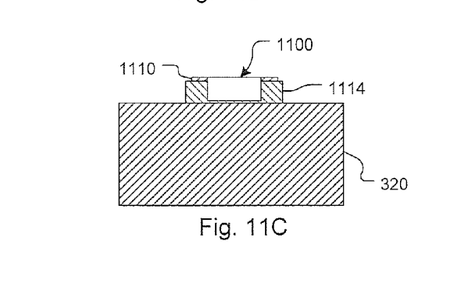
FIG. 11C is a longitudinal cross-sectional view of the pivoting-sliding support plate of FIG. 11B taken at XI-XI in FIG. 11B.

Referring now also to FIGS. 11A-11C in the drawings, respective top, oblique, and cross-sectional views of a pivoting-sliding support plate 1114 are shown. Support plate 1114 is used with pivoting-sliding support structures 308 and 310. Support plate 1114 includes wear plates 1108, 1110, and 1112. Support plate 1114 is similar to support plate 514, with the exception that circular bore 702 has been replaced with an elongated longitudinal slot 1100. Slot 1100 is configured to receive pivot pin 608 of bolster 506. This configuration allows bolster 506 to rotate relative to support plate 514 about a generally vertical axis C, and allows bolster 506 to translate within slot 1100 longitudinally relative to support plate 514. This unique combination of bores 702 and slots 1100 allows for the controlled movement of blades 106 within rail system 300, regardless of whether rail system 300 is moving along a straight section of railway of a curved section of railway.

Although it is preferred that rail system 300 be configured from spine-type railcars, it will be appreciated that any type of railcar capable of performing the described features of rail system 300 may be used in lieu of the spine-type railcars, including, but not limited to, idler railcars, flat-bed railcars, depressed center flat railcars, ordinary flat railcars, flat railcars with holes, specialized heavy duty railcars, articulated railcars, and other suitable railcars.

Figure 12:
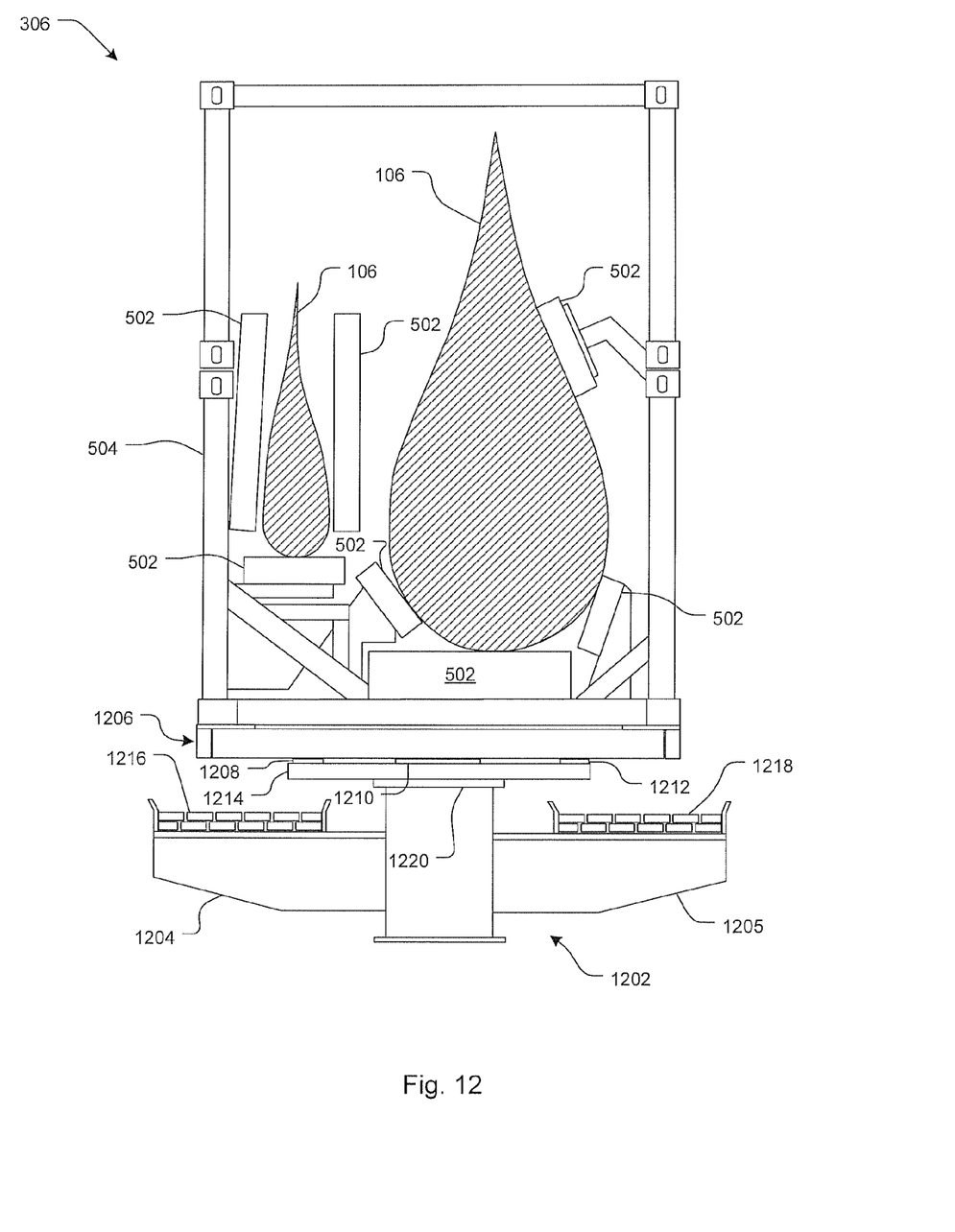
FIG. 12 is a front view of a support structure of the rail system of FIG. 3A according to an alternative embodiment of the present application.

Referring now to FIG. 12 in the drawings, an alternative embodiment of rail system 300 is illustrated. In this embodiment, a railcar 1202 for use with rail system 300 has been formed by modifying an existing trailer-transporting spinecar used for transporting tractor trailers over rail. The existing trailer-transporting spinecar includes outwardly extending support beams 1204 and 1205 that support longitudinal wheel decks 1216 and 1218, respectively. When used as a trailer-transporting spinecar, support beams 1204 and 1205 and wheel decks 1216 and 1218 receive and support the wheels from the tractor trailers. However, when used with rail system 300, support beams 1204 and 1205 and wheel decks 1216 and 1218 are not used. The modification and retrofitting of trailer-transporting spinecar is particularly advantageous for use with rail system 300, because these trailer-transporting spinecars are relatively inexpensive and readily available in the industry. Railcar 1202 includes a support plate 1214, a bolster 1206, and wear plates 1208, 1210, and 1212. It will be appreciated that not all trailer-transporting spinecars have the same height dimensions. Therefore, optional spacer plates 1220 may be used to compensate for varying heights.

Although rail system 300 has been described with respect to transporting large wind turbine blades, it should be understood that rail system 300 may be used to transport other lengthy objects, such as highway overpass beams.

It is evident by the foregoing description that the subject application has significant benefits and advantages, including: (1) the blades are allowed to simultaneously pivot and slide relative to the railcars as the rail system travels along the railway; (2) the system does not require relatively long railcars; (3) wasted space between loaded railcars is minimized; and (4) the number of railcars that not carry any of the load from the blades is minimized.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A rail system for transporting a set of one or more wind turbine blades, comprising:
    at least a first railcar and a second railcar coupled together;
    a pivoting support structure pivotally coupled to the first railcar, the pivoting support structure being configured to support a portion of the set of one or more wind turbine blades; and
    a pivoting-sliding support structure pivotally and slidingly coupled to the second railcar, the pivoting-sliding support structure being configured to support another portion of the set of one or more wind turbine blades; and
    at least one anti-rotation strap attached to the first railcar for limiting the rotation of the pivoting support structure about a generally transverse axis;
    wherein the pivoting support structure pivots in a generally horizontal plane relative to the first railcar; and
    wherein the pivoting-sliding support structure pivots in a generally horizontal plane relative to the second railcar and slides in a longitudinal direction relative to the second railcar.

2. The rail system according to claim 1, wherein the pivoting support structure comprises:
    a pivoting support plate coupled to the first railcar; and
    a pivoting bolster pivotally carried by the pivoting support plate.

3. The rail system according to claim 2, further comprising:
    one or more wear pads disposed between the pivoting support plate and the pivoting bolster.

4. The rail system according to claim 1, further comprising:
    one or more quick-release devices for releasably coupling the set of one or more wind turbine blades to the pivoting support structure.

5. The rail system according to claim 4, wherein the one or more quick-release devices is a bayonet-type twist-lock device.

6. The rail system according to claim 1, wherein the pivoting-sliding support structure comprises:
    a pivoting-sliding support plate coupled to the second railcar; and
    a pivoting-sliding bolster pivotally and slidingly carried by the pivoting-sliding support plate.

7. The rail system according to claim 6, further comprising:
    one or more wear pads disposed between the pivoting-sliding support plate and the pivoting-sliding bolster.

8. The rail system according to claim 1, further comprising:
    one or more quick-release devices for releasably coupling the set of one or more wind turbine blades to the pivoting-sliding support structure.

9. The rail system according to claim 8, wherein the one or more quick-release devices is a bayonet-type twist-lock device.

10. The rail system according to claim 1, further comprising:
    a first frame assembly for retaining the set of one or more wind turbine blades, the first frame assembly being configured for releasable attachment to the pivoting support structure; and
    a second frame assembly for retaining the set of one or more wind turbine blades, the second frame assembly being configured for releasable attachment to the pivoting-sliding support structure.

11. The rail system according to claim 1, wherein each railcar is a spine-type railcar.

* * * * *